United States Patent
Perry et al.

(10) Patent No.: US 7,282,290 B2
(45) Date of Patent: Oct. 16, 2007

(54) FREEZE TOLERANT FUEL CELL POWER PLANT WITH A DIRECT CONTACT HEAT EXCHANGER

(75) Inventors: Michael L. Perry, South Glastonbury, CT (US); Jeremy A. Schrooten, Hebron, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 738 days.

(21) Appl. No.: 10/750,347

(22) Filed: Dec. 31, 2003

(65) Prior Publication Data
US 2005/0095477 A1    May 5, 2005

Related U.S. Application Data

(63) Continuation-in-part of application No. 10/701,988, filed on Nov. 5, 2003, now Pat. No. 7,090,940.

(51) Int. Cl.
*H01M 8/04* (2006.01)
(52) U.S. Cl. ........................ 429/26; 429/13
(58) Field of Classification Search ........... None
See application file for complete search history.

(56) References Cited

U.S. PATENT DOCUMENTS

| | | | |
|---|---|---|---|
| 5,572,883 A * | 11/1996 | Roberts ................. | 62/434 |
| 6,365,291 B1 * | 4/2002 | Margiott ................. | 429/25 |
| 6,528,194 B1 | 3/2003 | Condit et al. | |
| 6,562,503 B2 * | 5/2003 | Grasso et al. ............ | 429/26 |
| 6,656,622 B2 * | 12/2003 | Grasso ................. | 429/26 |
| 6,797,421 B2 * | 9/2004 | Assarabowski et al. ... | 429/26 |
| 6,979,505 B2 * | 12/2005 | Grasso et al. ............ | 429/17 |
| 6,979,509 B2 * | 12/2005 | Breault et al. ........... | 429/26 |
| 2003/0039872 A1 * | 2/2003 | Grasso et al. ............ | 429/24 |
| 2005/0095477 A1 * | 5/2005 | Perry et al. ............. | 429/26 |
| 2006/0257700 A1 * | 11/2006 | Schrooten et al. ........ | 429/26 |

* cited by examiner

*Primary Examiner*—Susy Tsang-Foster
*Assistant Examiner*—Alix Echelmeyer
(74) *Attorney, Agent, or Firm*—Malcolm J. Chisholm, Jr.

(57) ABSTRACT

A power plant (10) includes at least one fuel cell (12), a coolant loop (18) including a freeze tolerant accumulator (22) for storing and separating a water immiscible fluid and water coolant, a direct contact heat exchanger (56) for mixing the water immiscible fluid and the water coolant within a mixing region (72) of the heat exchanger (56), a coolant pump (21) for circulating the coolant through the coolant loop (18), a radiator loop (84) for circulating the water immiscible fluid through the heat exchanger (56), a radiator (86) for removing heat from the coolant, and a direct contact heat exchanger by-pass system (200). The plant (10) utilizes the water immiscible fluid during steady-state operation to cool the fuel cell and during shut down of the plant to displace water from the fuel cell (12) to the freeze tolerant accumulator (22).

18 Claims, 2 Drawing Sheets

FREEZE TOLERANT FUEL CELL POWER PLANT WITH A DIRECT CONTACT HEAT EXCHANGER

CROSS-REFERENCE TO RELATED APPLICATION

This application is a continuation-in-part of prior application Ser. No. 10/701,988, filed on Nov. 5, 2003, now U.S. Pat. No. 7,090,940.

TECHNICAL FIELD

The present invention relates to fuel cell power plants that are suited for usage in transportation vehicles, portable power plants, or as stationary power plants, and the invention especially relates to a fuel cell power plant that utilizes a direct contact heat exchanger that facilitates transfer of energy from a water coolant directly to a low freezing temperature water immiscible fluid during operation of the plant, wherein the water immiscible fluid also displaces a water coolant within fuel cells and a coolant loop of the plant during shut down of the plant.

BACKGROUND ART

Fuel cell power plants are well known and are commonly used to produce electrical energy from hydrogen containing reducing fluid fuel and oxygen containing oxidant reactant streams to power electrical apparatus such as stationary power plants and transportation vehicles. In fuel cell power plants of the prior art, it is known that product water generated by fuel cells of the plant is often utilized to provide water for plant systems such as fuel reformers as well as to humidify gaseous reactant streams. Such product water however presents significant freeze related problems for the plant, especially during shut down and start up of the plant in sub-freezing ambient conditions.

Solutions to such freeze related problems are disclosed in U.S. Pat. No. 6,528,194 that issued on Mar. 4, 2003 to Condit et al., and in U.S. Pat. No. 6,562,503 that issued on May 13, 2003 to Grasso et al., both of which patents are entitled "Freeze Tolerant Fuel Cell Power Plant", and both of which are owned by the owner of all rights in the present invention. Those patents disclose the use of low freezing temperature water immiscible fluids as purge fluids, during a shut down and start up of the plant to displace water from key system components.

When the fuel cell power plant disclosed in those patents is shut down for a short term shut down, displacement valves operate to control flow of the water coolant out of a fuel cell cooling coolant loop into a freeze tolerant, open tube accumulator, and to control flow of the water immiscible fluid into the coolant loop to displace the water coolant. For a long term shut down, the same procedure is undertaken to direct the water coolant into the accumulator; to direct the water immiscible fluid into the coolant loop to displace the water coolant; and, to then drain the water immiscible fluid back into the accumulator.

To start up such a power plant after a long term shut down, the water immiscible fluid is first directed to pass from the accumulator through a heater or directly through operating fuel cells of the plant and into a recycle line to flow through open tubes of the accumulator to melt the frozen water coolant. Whenever fuel cells of the plant have attained a desired operating temperature and the water coolant within the freeze tolerant accumulator has melted, flow of the water immiscible fluid out of the accumulator is terminated, and thawed water coolant is directed to flow through the coolant loop to cool the fuel cells and manage fuel cell product water. The freeze tolerant fuel cell power plant is then in a steady-state operation wherein the water coolant continues to cycle from the accumulator through the fuel cells and back to the accumulator, and the water immiscible fluid remains stored within the accumulator. The displacement or purge of the water coolant by the water immiscible fluid out of the fuel cells and coolant loop prevents mechanical damage to the plant by preventing the freezing of the water coolant during a shutdown and start up, until the water coolant is within the freeze tolerant accumulator. Also, the low freezing temperature water immiscible fluid transfers heat from the fuel cells or an external heater to melt frozen coolant water within the accumulator upon start up.

While the approach of these known solutions to freeze protection is effective, nonetheless during steady-state operation of the plant, the water immiscible fluid is not utilized, and remains inefficiently stored within the accumulator. Also, a large volume of fuel cell product water and/or water coolant is required for efficient cooling of the plant, and such a large volume of water must be melted upon power plant start up after an extended shut down in sub-freezing ambient conditions. Therefore, there is a need for a freeze tolerant fuel cell power plant that efficiently utilizes a water immiscible purge fluid and that minimizes a volume of water used in cooling the plant.

DISCLOSURE OF INVENTION

The invention is a freeze tolerant fuel cell power plant for generating an electrical current from hydrogen containing reducing fluid fuel and oxygen containing oxidant reactant streams. The plant includes at least one fuel cell including a coolant inlet and a coolant outlet for directing a coolant to flow through the fuel cell. A coolant loop includes a freeze tolerant accumulator, such as an open tube accumulator, secured in fluid communication with the fuel cell coolant outlet for storing and separating a water immiscible fluid and water coolant; a direct contact heat exchanger secured in fluid communication with the accumulator and with the fuel cell coolant inlet; and, a fuel cell pump secured in fluid communication with a coolant passage of the coolant loop for circulating coolant through the coolant loop.

The plant also includes a radiator loop including a radiator secured in fluid communication between a water immiscible fluid discharge and water immiscible fluid inlet of the direct contact heat exchanger for removing heat from the water immiscible fluid passing through the radiator; a radiator pump secured to the radiator loop for circulating the water immiscible fluid through the radiator and direct contact heat exchanger; and, a water immiscible fluid reservoir secured in fluid communication with the radiator and the direct contact heat exchanger for supplying the water immiscible fluid to the radiator loop and coolant loop.

The plant also includes a direct contact heat exchanger by-pass system for directing flow of the coolant directly from the coolant loop through the radiator and back to the coolant loop without passing through the direct contact heat exchanger. The by-pass system also restricts flow of the water immiscible fluid through the radiator and coolant loop. The direct contact heat exchanger by-pass system facilitates usage of the water coolant whenever the plant experiences a high heat rejection demand, such as whenever the ambient temperatures are in excess of 30 degrees Celsius ("° C."). Water has a higher thermal rejection capability than the water immiscible fluids appropriate for coolants in the power plant. Therefore, the by-pass system provides for use of water as the heat rejection coolant during periods of high heat rejection requirements, while isolating the water immiscible fluid coolant out of the coolant loop.

Operation control valves for operating the plant include: an accumulator feed valve secured in fluid communication with the accumulator for selectively directing the coolant within the coolant loop to flow into either a water inlet of the accumulator or a water immiscible fluid inlet of the accumulator; an accumulator discharge valve for selectively directing flow from the accumulator into the coolant loop from an accumulator water outlet, from an accumulator water immiscible fluid outlet, or from an accumulator water immiscible fluid discharge header; a direct contact heat exchanger feed valve for selectively directing the coolant to flow into a mixing inlet of the direct contact heat exchanger or to by-pass the direct contact heat exchanger. A water immiscible fluid reservoir feed valve may also be secured to the radiator loop for selectively directing flow of the water immiscible fluid from the radiator into the reservoir or into the direct contact heat exchanger. Direct contact heat exchanger by-pass valves selectively direct flow of the water coolant from the coolant loop to the radiator and back to the coolant loop by-passing the direct contact heat exchanger. Also, water immiscible fluid isolation valves restrict flow of the water immiscible fluid coolant from the direct contact heat exchanger, radiator loop and water immiscible fluid reservoir into the coolant loop whenever the by-pass valves direct flow of the water coolant directly through the radiator by-passing the direct contact heat exchanger.

In a preferred embodiment wherein a portion of the fuel cell product water passes into the coolant loop, such as through a porous water transport plate adjacent to the fuel cell, the accumulator may include a water overflow discharge line to direct excess product water out of the plant.

By providing for direct contact between the water coolant and the water immiscible fluid within the direct contact heat exchanger, the power plant of the present invention facilitates efficient usage of a low freezing temperature water immiscible fluid in both directly cooling the plant and purging water coolant from fuel cells of the plant, while also minimizing a volume of water coolant necessary to operate the plant.

Accordingly, it is a general purpose of the present invention to provide a freeze tolerant fuel cell power plant with a direct contact heat exchanger that overcomes deficiencies of the prior art.

It is a more specific purpose to provide a freeze tolerant fuel cell power plant with a direct contact heat exchanger that provides for usage of a water immiscible fluid in cooling the plant and purging water from a fuel cell of the plant during shut down of the plant.

These and other purposes and advantages of the present passive water management system for a fuel cell power plant will become more readily apparent when the following description is read in conjunction with the accompanying drawings.

DESCRIPTION OF THE PREFERRED EMBODIMENTS

Figure 1:
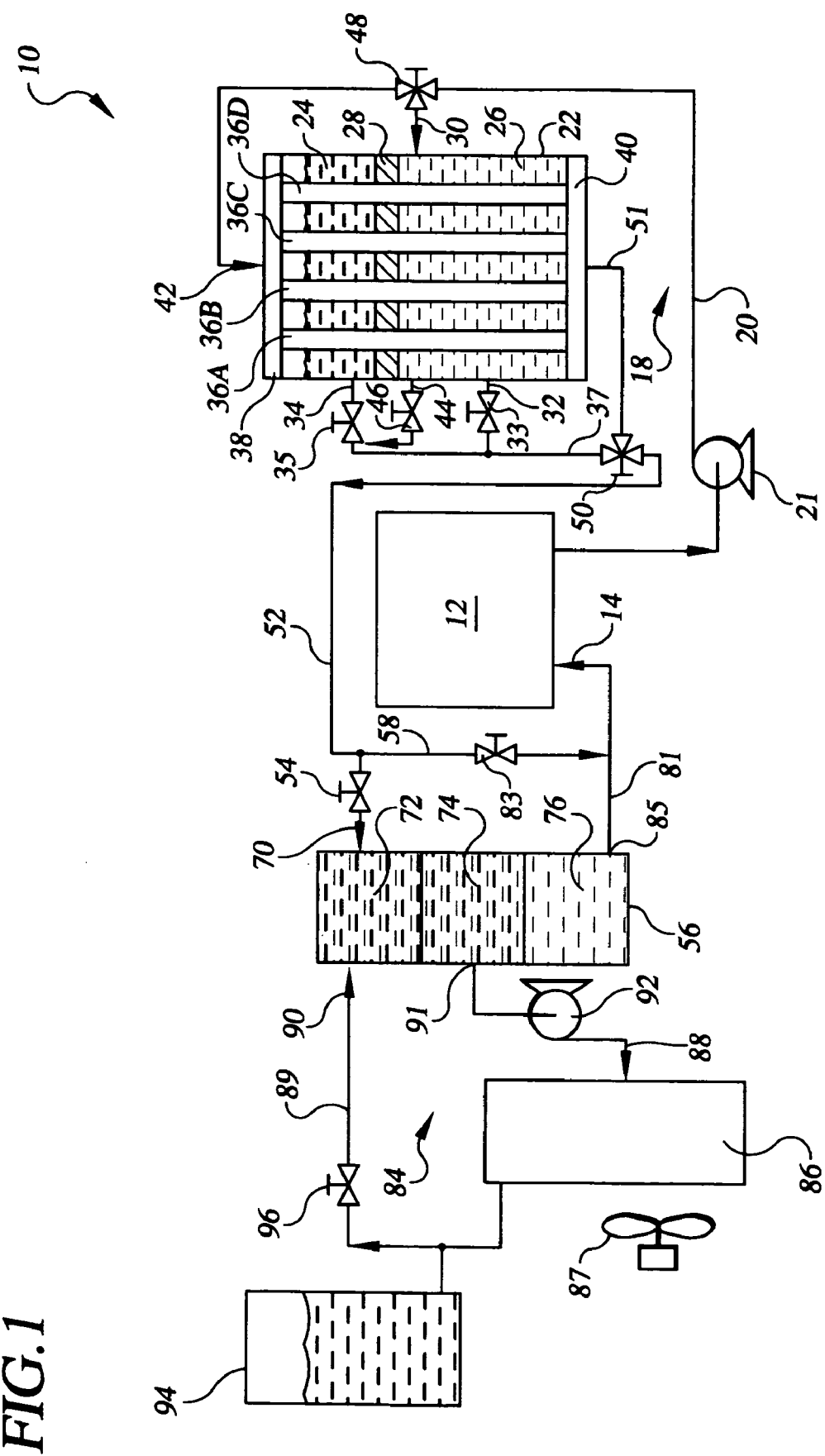
FIG. 1 is a schematic representation of a preferred embodiment of a freeze tolerant fuel cell power plant with a direct contact heat exchanger constructed in accordance with the present invention.

Referring to the drawings in detail, a freeze tolerant fuel cell power plant with a direct contact heat exchanger is shown in FIG. 1, and is generally designated by the reference numeral 10. The plant 10 includes at least one fuel cell 12 for generating electrical current from hydrogen containing reducing fluid and oxygen containing oxidant reactant streams as is known in the art. The fuel cell includes a coolant inlet 14 and a coolant outlet 16 for directing flow of a coolant, such as a water coolant, through the fuel cell 12. A coolant loop 18 provides for circulating the coolant from the coolant outlet 16 to the coolant inlet 14, and includes a coolant passage 20 secured in fluid communication between the coolant outlet 16 and coolant inlet 14, and a coolant circulating means secured to the coolant passage 20, such as a first coolant pump 21. The coolant loop 18 also includes a freeze tolerant accumulator means for storing and separating the water coolant and a water immiscible fluid in such a manner that the accumulator means is not damaged by freezing of the water coolant. An exemplary freeze tolerant accumulator means 22 is an open tube accumulator shown schematically in FIG. 1, and also described in the aforesaid U.S. Pat. 6,562,503.

The accumulator 22 includes a water immiscible fluid region 24 and a water region 26 that may be separated by a porous layer, such as a sponge or membrane 28. The sponge 28 facilitates separation of water coolant and water immiscible fluid within the accumulator 22 while permitting movement of any of the water coolant and/or water immiscible fluid through the sponge 28 during a separation of the liquids based upon their differing densities. The accumulator 22 also includes a water inlet 30 secured in fluid communication with the water region 26 of the accumulator 22 and an accumulator water outlet 32 that is also secured in fluid communication with the water region 26. A water outlet valve 33 is secured in fluid communication with the accumulator water outlet 32 and accumulator outlet line 37. An accumulator water immiscible fluid outlet 34 and water immiscible fluid outlet valve 35 is secured to the water immiscible fluid region 24 of the accumulator 22 for selectively directing flow of the water immiscible fluid out of the accumulator 22. The accumulator 22 also includes a plurality of tubes 36A, 36B, 36C, 36D extending through the water region 26 of the accumulator 22 and between a water immiscible fluid inlet header 38 and a water immiscible fluid discharge header 40. A water immiscible fluid inlet 42 is secured in fluid communication with the accumulator inlet header 38 for directing flow of the water immiscible fluid into the inlet header 38 and through the tubes 36A, 36B, 36C, 36D to the accumulator discharge header 40. The accumulator 22 may also include a water overflow discharge line 44 and water discharge vent valve 46.

An accumulator feed valve means 48 is secured in fluid communication with the coolant passage 20 for selectively controlling flow of the coolant from the coolant passage 20 either into the water inlet 30 or the water immiscible fluid inlet 42 of the accumulator 22. The accumulator feed valve means 48, and any "valve means" described herein, include a described form of the valve, such as a common accumulator feed three-way valve 48 shown in FIG. 1 secured to the coolant passage 20, or any other structure or structures known in the art and capable of performing the described flow control functions, such as two separate valves (not shown) secured in fluid communication with, and adjacent to, the water inlet 30 and water immiscible fluid inlet 42 of the accumulator 22.

In a particular operation of the plant 10, the accumulator feed valve means 48 may direct water immiscible fluid to pass into the accumulator 22 through the water inlet 30. In such circumstances, the accumulator sponge 28 permits the water immiscible fluid to pass from the water region 22 of the accumulator 22 through the sponge 28 into the water immiscible region 24.

An accumulator discharge valve means 50 is secured in fluid communication with the accumulator water outlet 32 and accumulator outlet line 37 for directing the water coolant or the water immiscible fluid from the accumulator 22 along the coolant loop 18 within a first extension 52 of the coolant passage 20. The accumulator discharge valve means may include the water immiscible fluid outlet valve 35, water outlet valve 33 and outlet line 37 as the separate components shown in FIG. 1 along with an accumulator discharge three-way valve 50 secured to the accumulator outlet line 37 and a water immiscible fluid flow through header line 51 secured to the discharge header 40, or the accumulator discharge valve means 50 may be an integral unit combining those components. A direct contact heat exchanger feed valve means 54 is secured to the first extension 52 of the coolant passage 20 and in fluid communication with a mixing inlet 70 of a direct contact heat exchanger 56 for selectively directing the water coolant to flow into the inlet 70 (also referred to herein as a "water coolant inlet 70") of the heat exchanger 56 from the accumulator 22. Alternatively, the direct contact heat exchanger feed valve means 54 may direct the water coolant to by-pass the heat exchanger 56 during a shut down or start up process via a by-pass coolant passage 58 secured between the first extension 52 of the coolant passage 20 and the coolant inlet 14 of the fuel cell 12.

The direct contact heat exchanger 56 is utilized to transfer waste heat from the fuel cell 12 to the ambient environment. The water coolant, circulating through the fuel cell 12, mixes with a water immiscible fluid within the direct contact heat exchanger 56 and transfers the thermal energy from the water coolant to the water immiscible fluid. The two fluids then separate within the direct contact heat exchanger 56, and the water coolant is circulated back through the fuel cell 12 while the water immiscible fluid is circulated through a radiator loop 84 that discharges the thermal energy to ambient.

The direct contact heat exchanger 56 has three regions: a mixing region 72, a separation region 74, and a water region 76. The coolant water flows from the heat exchanger 56 through a second extension 81 of the coolant passage 20, through the coolant inlet 14, and into the fuel cell 12. The direct contact heat exchanger feed valve means 54 may be in the form of a two-way valve 54 secured between the coolant passage 20 and the mixing inlet 70 along with an additional two-way by-pass valve 83 secured to the by-pass coolant passage 58. Or, the direct contact heat exchanger feed valve means 54 may be in the form of a three-way valve (not shown) secured between the coolant passage 20 and the mixing inlet 70 for selectively directing the coolant to flow into the mixing region 72 of the direct contact heat exchanger 56 or to flow through the by-pass coolant passage 58.

The plant 10 also includes the radiator loop 84 including a radiator 86 secured in fluid communication between a water immiscible fluid discharge 91 and a water immiscible fluid inlet 90 of the direct contact heat exchanger 56 for removing heat from the water immiscible fluid passing through the radiator 86; a radiator pump 92 secured to the radiator loop 84 for circulating the water immiscible fluid through the radiator 86 and direct contact heat exchanger 56; a water immiscible fluid reservoir 94 secured in fluid communication with the radiator 86 and the direct contact heat exchanger 56 for supplying the water immiscible fluid to the radiator loop 84 and coolant loop 18; and, a water immiscible fluid reservoir feed valve means 96 that may be secured in fluid communication between the radiator 86 and mixing region 72 of the heat exchanger 56 for selectively controlling flow of the water immiscible fluid to circulate within the radiator loop 84 from the radiator 86 or to feed the water immiscible fluid reservoir 94. The radiator 86 and reservoir 94 may be secured in fluid communication with a water immiscible fluid inlet line 89 leading to the water immiscible fluid inlet 90. The radiator may include a fan 87 such as known in an automotive radiator and fan.

The freeze tolerant accumulator means 22 and direct contact heat exchanger means 56 described above are constructed so that the water immiscible fluid is less dense than the water coolant. Therefore, during a steady-state operation, the water coolant descends to the water region 26 of the accumulator 22 and to the water region 76 of the heat exchanger 56. Meanwhile, the water immiscible fluid remains primarily within the separation region 74 of the heat exchanger 56 and within the reservoir 94. However, one skilled in the art could readily construct a freeze tolerant accumulator means 22 and direct contact heat exchanger means 56 that utilizes a water immiscible fluid that is more dense than the water coolant.

Figure 2:
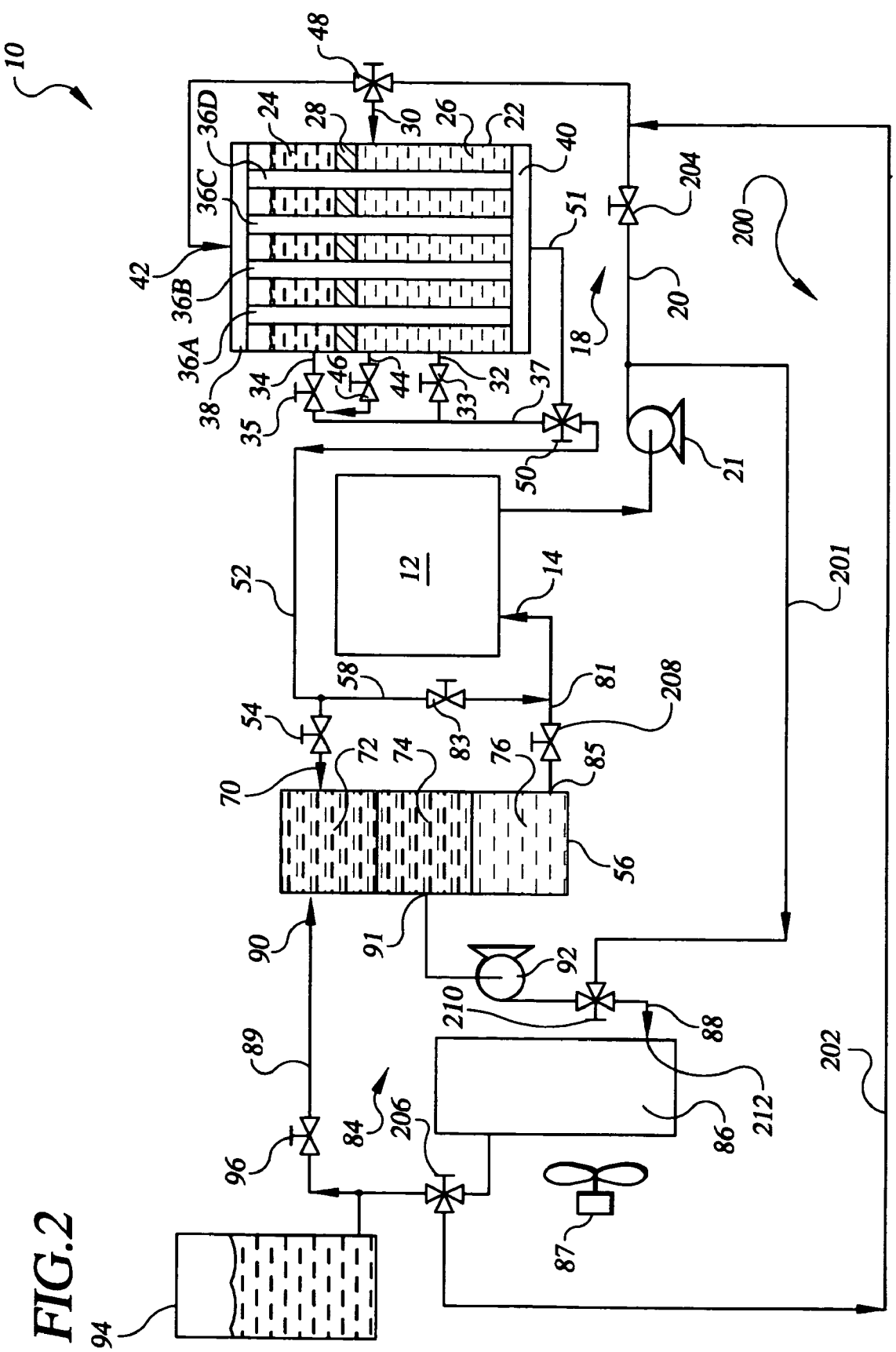
FIG. 2 is the schematic representation of the FIG. 1 embodiment of the freeze tolerant fuel cell power plant showing a direct contact heat exchanger by-pass system.

As shown in FIG. 2, the freeze tolerant fuel cell power plant 10 also includes a direct contact heat exchanger by-pass system means 200 for directing flow of the coolant from the coolant loop 18 through the radiator 86 and back to the coolant loop 18 without passing through the direct contact heat exchanger 56. The by-pass system 200 includes a by-pass feed line 201 secured in fluid communication between the coolant loop 18 and the radiator 86, such as secured between the coolant passage 20 and the water immiscible fluid discharge line 88 that extends between the direct contact heat exchanger 56 and the radiator 86. The by-pass system 200 also includes a by-pass return line 202 secured in fluid communication between the radiator 86 and the coolant loop 20, such as secured between the water immiscible fluid inlet line 89 and the coolant passage 20.

The by-pass system 200 also includes by-pass valve means for directing the coolant to flow from the coolant loop 18 through the by-pass feed line 201 to the radiator 86 and from the radiator back through the by-pass return line 202 to the coolant loop 18 without passing through the direct contact heat exchanger 56. Any valves or flow control apparatus known in the art that can achieve the described function of the by-pass valve means are appropriate for the present invention. Exemplary by-pass valve means shown in FIG. 2 include a coolant loop by-pass feed valve 204 that interrupts flow of the coolant through the coolant passage 20 of the coolant loop so that the coolant flows into the by-pass feed line 201. The by-pass valve means also includes any valve that prohibits flow of the coolant from the coolant loop 18 into the direct contact heat exchanger 56, such as the direct contact heat exchanger feed valve 54 and two-way by-pass or direct contact heat exchanger by-pass valve 83 secured to the first extension 52 of the coolant passage 20 (shown in both FIGS. 1 and 2). An additional exemplary by-pass valve is a radiator loop by-pass valve 206 secured to direct the coolant being discharged out of the radiator 86 into the by-pass return line 202, such as being secured to the water immiscible fluid inlet line 89 that extends between the radiator 86 and the direct contact heat exchanger 56. The radiator loop by-pass valve 206 may be a three-way valve known in the art for selectively directing flow of the coolant from the radiator 86 into either the by-pass return line 202 or the water immiscible fluid inlet line 89 and for restricting flow into or from the non-selected source of flow.

The by-pass system 200 also includes water immiscible fluid isolation valve means for restricting flow of the water immiscible fluid from the direct contact heat exchanger 56, water immiscible fluid reservoir 94 and radiator loop 84 into the coolant loop 18 whenever the by-pass valve means are directing flow of the coolant directly from the coolant loop 18 to the radiator 86 and back to the coolant loop 18 by-passing the direct contact heat exchanger 56. Any valves or flow control apparatus known in the art that can achieve that described function are appropriate for the present invention. Exemplary water immiscible fluid isolation valve means shown in FIG. 2 include a direct contact heat exchanger discharge valve 208 secured in fluid communication with an outlet, such as the water outlet 85, of the direct contact heat exchanger 54. An additional water immiscible fluid isolation valve means shown in FIG. 2 is a radiator inlet valve 210 secured in fluid communication between the by-pass feed line 201, the water immiscible fluid discharge line 88 extending between the direct contact heat exchanger 56 and the radiator 86 and a radiator inlet 212, as shown in FIG. 2. The radiator inlet valve 210 may be a three-way valve known in the art, or any other flow control valve or apparatus that may selectively direct flow from either the by-pass feed line 201 or the direct contact heat exchanger 56 into the radiator 86 and that also restricts flow into or from the non-selected source of flow.

During steady-state operation of the plant 10, the coolant pump 21 circulates the water coolant from the fuel cell 12, through the coolant outlet 16, through the coolant passage 20, through the accumulator feed valve 48, through the freeze tolerant accumulator water inlet 30, through the accumulator water outlet 32, and through the accumulator discharge valve 50. From there, the water coolant passes through the first extension 52 of the coolant passage 20, through the direct contact heat exchanger feed valve 54, through the mixing inlet 70 of the direct contact heat exchanger 56, and into the mixing region 72 of the heat exchanger 56. The water immiscible fluid inlet 90 of the direct contact heat exchanger 56 simultaneously directs flow of the water immiscible fluid from the radiator loop 84 into the mixing region 72 of the direct contact heat exchanger 56 to mix directly with the water coolant so that thermal energy from the water coolant is transferred to the water immiscible fluid. Based upon differing densities, the water coolant and water immiscible fluid within the heat exchanger 56 separate. The water coolant descends to the water region 76 of the heat exchanger 56, and the water immiscible fluid moves from the mixing region 72 to the separation region 74 of the heat exchanger 56. The water coolant within the water region 76 of the heat exchanger 56 then flows through a water coolant outlet 85 of the heat exchanger 56 into the second extension 81 of the coolant passage 20 back into the coolant loop 18 and into the fuel cell 12 through the coolant inlet 14. Meanwhile, the heated water immiscible fluid flows from the water immiscible fluid discharge 91 defined in the separation region 74 of the radiator loop 86 into a water immiscible fluid discharge line 88 of the radiator loop 84 through the radiator 86 and then back into the heat exchanger 56 to remove heat through the radiator 86.

If the power plant 10 requires a high rate of heat rejection, such as if ambient temperatures exceed 30° C., the direct contact heat exchanger by-pass system 200 may be operated to enhance heat rejection by the plant 10. Operation of the system includes controlling the coolant loop by-pass valve 204 to direct flow of the coolant from the coolant loop 18 into the by-pass feed line 201; controlling the radiator inlet valve 210 to direct flow of the coolant from the by-pass feed line 201 into the radiator inlet 212; and controlling the radiator loop by-pass valve 206 to direct flow of the coolant from the radiator 86 through the by-pass return line 202 to the coolant loop 18 and to restrict flow of the water immiscible fluid from the reservoir 94 into the by-pass return line 202. Additionally, the radiator inlet valve 210 is controlled to prohibit flow of the water immiscible fluid from the direct contact heat exchanger 56 into the radiator 86, while the direct contact heat exchanger valve 208 is controlled to prohibit flow of coolant out of the direct contact heat exchanger 56 into the second extension 81 of the coolant passage 20 of the coolant loop 18. Also, the direct contact heat exchanger feed valve 54 is controlled to prohibit flow of coolant into the direct contact heat exchanger 56 and the two-way by-pass or direct contact heat exchanger by-pass valve 83 is controlled to direct flow of the coolant through the fuel cell 12. During use of the direct contact heat exchanger by-pass system 200, the radiator pump 92 is turned off.

The direct contact heat exchanger by-pass system 200 thereby directs flow of the coolant from the coolant passage 20 through the by-pass feed line 201, radiator 86, by-pass return line 202, into and through the accumulator 22 wherein any water immiscible fluid is separated into the water immiscible fluid region 24 of the accumulator. Water coolant is then directed through the water outlet valve 33 from the accumulator 22 into the first extension 52 of the coolant passage 20, through the direct contact heat exchanger by-pass valve 83 and through the second extension 81 of the coolant passage 20 into the coolant inlet 14, then through the fuel cell 12 and coolant outlet 16, coolant pump 21, and back into the by-pass feed line 201.

The direct contact heat exchanger by-pass system 200 thereby provides for usage of the water coolant to reject heat from the fuel cell 12, instead of the water immiscible fluid coolant. The water coolant has a higher thermal rejection capacity than the water immiscible fluid, and therefore provides for more efficient heat rejection. Additionally, use of the by-pass system 200 only requires use of the coolant pump 21 and does not require usage of the radiator pump 92, thereby providing further efficiency in operation of the plant 10.

To stop usage of the direct contact heat exchanger by-pass system 200, the coolant loop by-pass feed valve 204 is controlled to direct flow of the coolant through the coolant passage instead of into the by-pass feed line 201; the radiator inlet valve 210 is controlled to stop flow of the coolant from the by-pass feed line 201 into the radiator and instead to direct flow of the water immiscible fluid from the heat exchanger 56 into the radiator 86; the radiator loop by-pass valve 206 is controlled to direct flow of the coolant flowing out of the radiator 86 into the water immiscible fluid inlet line 89 instead of into the by-pass return line 202; the direct contact heat exchanger feed valve 54 is controlled to direct the coolant into the heat exchanger 56; the direct contact heat exchanger by-pass valve 83 is controlled to prohibit the coolant from by-passing the direct contact heat exchanger 56; the direct contact heat exchanger discharge valve 208 is controlled to direct flow of the coolant from the heat exchanger 56 into the second extension 81 of the coolant passage; and the radiator pump 92 is turned on, thereby returning the plant to steady-state operation.

During a shut down of the plant in sub-freezing ambient conditions, an electrical load (not shown) is disconnected from the fuel cell 12, and the water immiscible fluid outlet valve 35 secured in fluid communication with the accumulator water immiscible fluid outlet 34 and the accumulator discharge valve means 50 are controlled to direct water immiscible fluid stored within the accumulator 22 into the coolant loop 18 while the direct contact heat exchanger feed valve 54 is controlled to direct the flow of the water coolant and water immiscible fluid to by-pass the direct contact heat exchanger 56 through the by-pass coolant passage 58. The by-pass feed valve 204, radiator inlet valve 210, and radiator loop by-pass valve 206 are also controlled to direct flow of the water immiscible fluid through the by-pass feed line 201 and by-pass return line 202 for a short duration to purge water out of the feed and return lines 201, 202 with the water immiscible fluid. The accumulator water outlet valve 33 is also controlled to terminate flow of water out of the accumulator 22. If excess fuel cell 12 product water is passing from the accumulator 22 to other plant systems (not shown) through the accumulator's water discharge vent valve 46, the valve 46 is controlled to terminate flow.

The coolant pump 21 will then direct all of the water coolant into the accumulator 22 which provides for separation of the water coolant and water immiscible fluid based upon their differing densities until the water immiscible fluid has purged the water coolant from the fuel cell 12 and coolant passage 20 and into the accumulator 22. The direct contact heat exchanger feed valve 54 is then controlled to direct water immiscible fluid flow back into the heat exchanger 56 so that the water immiscible fluid from the accumulator 22 and the water immiscible fluid reservoir 94 flow through and fill the fuel cell 12 and the coolant loop 18, including the direct contact heat exchanger 56 and accumulator 22 thereby displacing the water in the direct contact heat exchanger 56. The first coolant pump 21 and radiator pump 92 are then shut down.

In starting up the power plant 10 from a sub-freezing shut down wherein the water coolant within the accumulator 22 has frozen, first, reactant streams are passed through the fuel cell 12 as the electrical load (not shown) is connected to the cell 12. This operation of the fuel cell 12 generates heat and electrical power. The heat generated by the fuel cell 12 is absorbed by circulating the water immiscible fluid through the fuel cell 12. The heated water immiscible fluid may be used to melt any ice in the accumulator 22. An electric heater (not shown) may also be placed within the coolant loop 18 or accumulator 22 to further heat the water immiscible fluid during start up from a sub-freezing condition. During such a start up, only the coolant pump 21 operates and the accumulator discharge valve means 50 is controlled to direct flow of the water immiscible fluid from the accumulator 22 and through the fuel cell 12 to heat the fluid while the direct contact heat exchanger feed valve 54 is controlled to direct the heated water immiscible fluid to by-pass the heat exchanger 56. The accumulator feed valve 48 is controlled to direct the heated water immiscible fluid to flow into the water immiscible fluid inlet 42 and inlet header 38 of the accumulator 22. The heated water immiscible fluid then flows through the tubes 36A, 36B, 36C, 36D of the accumulator 22 that pass through the frozen water coolant to melt the frozen water coolant.

Whenever the water coolant is melted, the radiator pump 92 is started, the direct contact heat exchanger feed valve 54 is controlled to direct the flow of the water immiscible fluid into the heat exchanger 56, and the water immiscible fluid reservoir feed valve means 96 is controlled to direct flow of the water immiscible fluid into the reservoir 94. The water immiscible fluid is thereby directed out of the fuel cell 12. When the volume of water immiscible fluid remaining within the accumulator 22 declines to a pre-determined storage volume, the accumulator discharge valve 50 is controlled to direct flow of the melted water coolant from the accumulator 22 to the direct contact heat exchanger 56, and the accumulator feed valve 48 is controlled to direct flow of the water coolant into the water inlet 30 of the accumulator 22. The accumulator water outlet valve 33 of the accumulator discharge valve means 50 is also controlled to direct flow of the water coolant from the accumulator 22 into the coolant loop. As coolant water displaces the water immiscible fluid from the fuel cell 12, the water immiscible fluid reservoir feed valve means 96 is controlled to direct flow so that the water immiscible fluid flows from the radiator 86 of the radiator loop 84 into the direct contact heat exchanger 56. Then, the accumulator's water discharge vent valve 46 is opened. The power plant 10 has been returned to a steady-state operation.

In operation of the freeze tolerant fuel cell power plant with a direct contact heat exchanger 10, the valves described above are controlled by a controller means known in the art for controlling valves. Such controller means actuate valves in response to sensed information. In particular, the controller means controls the accumulator feed valve means 48 for selectively directing the coolant within the coolant loop 18 to flow into either a water inlet 30 of the accumulator 22 or a water immiscible fluid inlet 42 of the accumulator 22; controls the accumulator discharge valve means 50 for selectively directing flow of the coolant from the accumulator 22 into the coolant loop 18 from the accumulator water outlet 32, from the accumulator water immiscible fluid outlet 34, or from the accumulator water immiscible fluid discharge header 40; controls the direct contact heat exchanger feed valve means 54 for selectively directing the coolant to flow into a mixing inlet 70 of the contact heat exchanger 56 or to by-pass the direct contact heat exchanger 56 via the by-pass coolant passage 58; and, controls the water immiscible fluid reservoir feed valve means 96 for selectively directing the coolant into the reservoir 94 or into the mixing region 72 of the heat exchanger 56. The controller means also controls the direct contact heat exchanger by-pass valve means 204, 54, 83, 206 for selectively directing flow of the coolant from the coolant loop 18 to the radiator 86 and back to the coolant loop 18 by-passing the direct contact heat exchanger 56, or for directing flow of the coolant through the coolant loop 18 and direct contact heat exchanger 56; and controls the water immiscible fluid isolation valve means 208, 210 for selectively prohibiting flow of the water immiscible fluid from the direct contact heat exchanger 56, water immiscible fluid reservoir 94, and radiator loop 84 into the coolant loop 18 whenever the by-pass valve means 204, 54, 206 direct flow of the coolant directly from the coolant loop 18 through the radiator 86 and back to the coolant loop 18. The controller means could actuate the accumulator feed valve means 48, the accumulator discharge valve means 50, the direct contact heat exchanger feed valve means 54, and the water immiscible fluid reservoir feed valve means 96 through well known mechanisms, including manual valve controls, electro-mechanical actuators, electro-hydraulic actuators, etc. The aforesaid valve means 48, 50, 54, 96 may also be combined or coordinated as an integral operational control valve means for performing the described functions of the present invention.

A first preferred water immiscible fluid is selected from the group consisting of silicon-containing fluids such as: silicones, silicone copolymers, substituted silicones, siloxanes, polysiloxanes, substituted siloxanes or polysiloxanes and mixtures thereof that have a freezing temperature that is at least as low as minus twenty (−20) degrees Celsius ("° C.") and that are not miscible with water. Suitable silicon-containing fluids are dimethyl fluids, which are available from the GE SILICONES Company of Waterford N.Y., U.S.A. and sold under the designation "SF96 series" or from the DOW CHEMICAL Midland, Mich., U.S.A. and sold under the designation of "Syltherm HF" or "Syltherm XLT". Suitable polysiloxane fluids are available from the aforesaid GE SILICONES Company and sold under the designation of "SF1488 series" or "SFxx88 series". These fluids are copolymers of polydimethylsiloxane and a polyethylene oxide.

A second preferred water immiscible fluid is selected from the group consisting of perfluorocarbons, hydrofluoroethers, and mixtures thereof that have a freezing temperature that is at least as low as minus twenty (−20) degrees Celsius ("° C.") and that are not miscible with water. Suitable perfluorocarbons are perfluoroalkanes, perfluorotrialkylamine and perfluorotributylamine, which are available from the 3M Company of St. Paul, Minn., U.S.A. and are sold under the designations of "Grades FC-77, FC-3283, and FC-40" respectively. A suitable hydrofluoroether is sold under the designation "Grade HFE-7500". The aforesaid perfluorocarbons are available from the 3M Company under the trademark "FLUORINERT PFC", and the suitable hydrofluoroethers are also available from the aforesaid 3M Company under the trademark "NOVEC HFE".

A third preferred water immiscible fluid is selected from the group consisting of alkanes, alkenes, alkynes, and mixtures thereof that have a freezing temperature that is at least as low as −20° C. and that are not miscible with water. Suitable alkanes include Heptane ($C_7H_{16}$, melting point −91° C.), Octane ($C_8H_{18}$, melting point −57° C.), Nonane ($C_9H_{20}$ melting point −54° C.), and Decane ($C_{10}H_{22}$, melting point −30° C.). Suitable alkenes included Cyclohexene ($C_6H_{10}$, melting point −103° C.), Heptene ($C_7H_{14}$, melting point −119° C.), Cycloheptene ($C_7H_{12}$, melting point −56° C.), Octene ($C_8H_{12}$, melting point −102° C.), Cylooctene (cis) ($C_8H_{14}$, melting point −12° C.), and Cylooctene (trans) ($C_8H_{14}$, melting point −59° C.). Suitable Alkynes include 2-Octyne ($C_8H_{14}$, melting point −62° C.), and 1-Decene ($C_{10}H_{18}$, melting point −36° C.). Many other alkanes, alkenes, alkynes having six or more carbon atoms, or mixtures thereof that have a freezing temperature that is at least as low as −20° C. and that are not miscible with water will also make a suitable water immiscible fluid, such as for example those having multiple double and/or triple bonds. All such alkanes, alkenes, and alkynes and mixtures thereof are available from large chemical suppliers, such as the Aldrich Company, of Milwaukee, Wis., U.S.A.

The preferred water immiscible fluids may also have surface tensions that are less than or equal to 35 dynes per square centimeter ("dynes/cm") and most preferably less than or equal to 20 dynes per square centimeter. The preferred water immiscible fluids also may have a solubility in water of less than 0.1 percent.

In a preferred embodiment wherein the fuel cell product water passes into the coolant loop 18, such as through a porous water transport plate (not shown) adjacent to the fuel cell 12, the fuel cell 12 product water may be directed from the accumulator 22 through the water overflow discharge line 44 and discharge vent valve 46 to direct the excess product water to other plant systems (not shown) or out of the plant 10.

It can be seen that the freeze tolerant fuel cell power plant with a direct contact heat exchanger 10 of the present invention efficiently utilizes a low freezing temperature water immiscible purge fluid to displace coolant water out of the fuel cell 12 to the freeze tolerant accumulator 22 while minimizing a volume of water used in cooling the plant 10. Furthermore, during steady-state operation, most of the water immiscible fluid is utilized within the power plant 10, instead of being stored within the accumulator 22. Consequently, the water immiscible fluid used during steady-state operation helps cool the plant 10 and reduces a total volume of water coolant needed to cool the plant 10.

The patents referred to above are hereby incorporated herein by reference.

While the present invention has been described with respect to a particular construction of a freeze tolerant fuel cell power plant with a direct contact heat exchanger 10, it is to be understood that the invention is not to be limited to the described or illustrated embodiments. Accordingly, reference should be made to the following claims rather than the foregoing description to determine the scope of the invention.

What is claimed is:

1. A freeze tolerant fuel cell power plant for generating an electrical current from hydrogen containing reducing fluid fuel and oxygen containing oxidant reactant streams, the plant comprising:
   a. at least one fuel cell (12) including a coolant inlet (14) and a coolant outlet (16) for directing a water immiscible fluid and a water component to flow through the fuel cell (12);
   b. a coolant loop (18) including a freeze tolerant accumulator means (22) secured in fluid communication with the fuel cell coolant outlet (16) for storing and separating the water immiscible fluid and the water component, a direct contact heat exchanger (56) secured in fluid communication with the accumulator means (22) and the fuel cell coolant inlet (14), and a coolant circulating means (21) secured in fluid communication with a coolant passage (20) of the coolant loop (18) for circulating the water immiscible fluid and the water component through the coolant loop (18);
   c. a radiator loop (84) including a radiator (86) secured in fluid communication between a water immiscible fluid discharge (91) and water immiscible fluid inlet (90) of the direct contact heat exchanger (56) that removes heat from the water immiscible fluid passing through the radiator (86), and a radiator pump (92) secured to the radiator loop (84) for circulating the water immiscible fluid through the radiator (86) and direct contact heat exchanger (56); and,
   d. a direct contact heat exchanger by-pass system means (200) for directing flow of the water component from the coolant loop (18) directly through the radiator (86) and back to the coolant loop (18) by-passing the direct contact heat exchanger (56).

2. The freeze tolerant fuel cell power plant (10) of claim 1, wherein the direct contact heat exchanger by-pass system means (200) comprises by-pass valve means for directing the water component to flow from the coolant loop (18) through a by-pass feed line (201) to the radiator (86) and from the radiator (86) through a by-pass return line (202) back to the coolant loop (18) by-passing the direct contact heat exchanger (56).

3. The freeze tolerant fuel cell power plant (10) of claim 2, wherein the direct contact heat exchanger by-pass system means (200) further comprises water immiscible fluid isolation valve means for restricting flow of the water immiscible fluid from the direct contact heat exchanger (56) and the radiator loop (84) into the coolant loop (18) whenever the by-pass valve means are directing flow of the water component directly from the coolant loop (18) to the radiator (86) and back to the coolant loop (18) by-passing the direct contact heat exchanger (56).

4. The freeze tolerant fuel cell power plant (10) of claim 2, wherein the by-pass valve means comprises a coolant loop by-pass feed valve (204) for selectively directing flow of the water component from the coolant loop (18) into the by-pass feed line (201), a direct contact heat exchanger feed valve (54) and direct contact heat exchanger by-pass valve (83) for selectively prohibiting flow of the water component into the direct contact heat exchanger (56), and a radiator loop by-pass valve (206) for selectively directing the water component discharged out of the radiator (86) into the by-pass return line (202).

5. The freeze tolerant fuel cell power plant (10) of claim 3, wherein the water immiscible fluid isolation valve means comprises a direct contact heat exchanger discharge valve (208) secured in fluid communication with an outlet of the direct contact heat exchanger (56) for selectively prohibiting flow of the water component out of the heat exchanger (56), and a radiator inlet valve (210) secured in fluid communication between the by-pass feed line (201), the direct contact heat exchanger (56) and the radiator (86) for selectively directing flow from either the by-pass feed line (201) or the heat exchanger (56) into the radiator (86).

6. The freeze tolerant fuel cell power plant (10) of claim 1, wherein the water immiscible fluid is selected from the group consisting of silicones, silicone copolymers, substituted silicones, siloxanes, polysiloxanes, substituted siloxanes or polysiloxanes and mixtures thereof.

7. The freeze tolerant fuel cell power plant (10) of claim 1, wherein the water immiscible fluid is selected from the group consisting of perfluorocarbons, hydrofluoroethers and mixtures thereof.

8. The freeze tolerant fuel cell power plant (10) of claim 1, wherein the water immiscible fluid is selected from the group consisting of alkanes, alkenes, alkynes having six or more carbon atoms and mixtures thereof.

9. The freeze tolerant fuel cell power plant (10) of claim 1, wherein the water immiscible fluid has a freezing temperature equal to or less than minus twenty degrees Celsius, has a surface tension of less than or equal to 35 dynes/cm, and has a solubility in water of less than 0.1 percent.

10. The freeze tolerant fuel cell power plant (10) of claim 1, wherein the water immiscible fluid has a freezing temperature equal to or less than minus twenty degrees Celsius, has a surface tension of less than or equal to 20 dynes/cm, and has a solubility in water of less than 0.1 percent.

11. A method of operating a freeze tolerant fuel cell power plant (10), the power plant (10) including at least one fuel cell (12) having a coolant inlet (14) and a coolant outlet (16) for directing a water immiscible fluid and a water component to flow through the fuel cell (12), a coolant loop (18) including a freeze tolerant accumulator (22) secured in fluid communication with the fuel cell coolant outlet (16) for storing and separating the water immiscible fluid and the water component, and a coolant pump (21) secured in fluid communication with a coolant passage (20) of the coolant loop (18) for circulating the water component and water immiscible fluid through the coolant loop (18), the method comprising the steps of:

a. securing a direct contact heat exchanger (56) in fluid communication with the accumulator (22) and the fuel cell coolant inlet (14);

b. providing a radiator loop (84) including a radiator (86) secured in fluid communication between a water immiscible fluid discharge (91) and water immiscible fluid inlet (90) of the direct contact heat exchanger (56) that removes heat from the water immiscible fluid passing through the radiator (86), a radiator pump (92) secured to the radiator loop (84) for circulating the water immiscible fluid through the radiator (86) and direct contact heat exchanger (56); and, c. selectively directing flow of the water component from the coolant loop (18) directly through the radiator (86) and back to the coolant loop (18) by-passing the direct contact heat exchanger (56).

12. The method of claim 11, comprising the further steps of restricting flow of the water immiscible fluid from the direct contact heat exchanger (56) and the radiator loop (84) into the coolant loop (18) whenever the water component is directed to flow directly from the coolant loop (18) to the radiator (86) and back to the coolant loop (18) by-passing the direct contact heat exchanger (56).

13. The method of claim 11, comprising the further step of directing flow of the water component from the coolant loop (18) through the radiator (86) and back to the coolant loop (18) by-passing the direct contact heat exchanger (56) whenever an ambient temperature is greater than thirty degrees Celsius.

14. The method of claim 11, comprising the further step of turning off the radiator pump (92) during the step of selectively directing flow of the water component from the coolant loop (18) directly through the radiator (86).

15. A freeze tolerant fuel cell power plant for generating an electrical current from hydrogen containing reducing fluid fuel and oxygen containing oxidant reactant streams, the plant comprising:

a. at least one fuel cell (12) including a coolant inlet (14) and a coolant outlet (16) for directing a water immiscible fluid and a water component to flow through the fuel cell (12);

b. a coolant loop (18) including a freeze tolerant accumulator means (22) secured in fluid communication with the fuel cell coolant outlet (16) for storing and separating the water immiscible fluid and the water component, a direct contact heat exchanger (56) secured in fluid communication with the accumulator means (22) and the fuel cell coolant inlet (14), and a coolant circulating means (21) secured in fluid communication with a coolant passage (20) of the coolant loop (18) for circulating the water immiscible fluid and the water component through the coolant loop (18);

c. a radiator loop (84) including a radiator (86) secured in fluid communication between a water immiscible fluid discharge (91) and water immiscible fluid inlet (90) of the direct contact heat exchanger (56) that removes heat from the water immiscible fluid passing through the radiator (86), and a radiator pump (92) secured to the radiator loop (84) for circulating the water immiscible fluid through the radiator (86) and direct contact heat exchanger (56); and, d. a direct contact heat exchanger by-pass system means (200) for directing flow of the water component from the coolant loop (18) through the radiator (86) and back to the coolant loop (18) by-passing the direct contact heat exchanger (56), the direct contact heat exchanger by-pass system means (200) comprising a by-pass valve means for directing the water component to flow from the coolant loop (18) through a by-pass feed line (201) to the radiator (86) and from the radiator (86) through a by-pass return line (202) back to the coolant loop (18) by-passing the direct contact heat exchanger (56).

16. The freeze tolerant fuel cell power plant (10) of claim 15, wherein the direct contact heat exchanger by-pass system means (200) further comprises water immiscible fluid isolation valve means for restricting flow of the water immiscible fluid from the direct contact heat exchanger (56) and the radiator loop (84) into the coolant loop (18) whenever the by-pass valve means are directing flow of the water component directly from the coolant loop (18) to the radiator (86) and back to the coolant loop (18) by-passing the direct contact heat exchanger (56).

17. The freeze tolerant fuel cell power plant (10) of claim 15, wherein the by-pass valve means comprises a coolant loop by-pass feed valve (204) for selectively directing flow of the water component from the coolant loop (18) into the by-pass feed line (201), a direct contact heat exchanger feed valve (54) and direct contact heat exchanger by-pass valve (83) for selectively prohibiting flow of the water component into the direct contact heat exchanger (56), and a radiator loop by-pass valve (206) for selectively directing the water component discharged out of the radiator (86) into the by-pass return line (202).

18. The freeze tolerant fuel cell power plant (10) of claim 16, wherein the water immiscible fluid isolation valve means comprises a direct contact heat exchanger discharge valve (208) secured in fluid communication with an outlet of the direct contact heat exchanger (56) for selectively prohibiting flow of the water component out of the heat exchanger (56), and a radiator inlet valve (210) secured in fluid communication between the by-pass feed line (201), the direct contact heat exchanger (56) and the radiator (86) for selectively directing flow from either the by-pass feed line (201) or the heat exchanger (56) into the radiator (86).

* * * * *